United States Patent
Castillo et al.

(10) Patent No.: US 11,753,579 B2
(45) Date of Patent: Sep. 12, 2023

(54) NANOFLUID FOR FINES MIGRATION REDUCTION AND ENHANCED OIL RECOVERY, METHOD OF PREPARATION AND USES

(71) Applicant: TotalEnergies OneTech, Courbevoie (FR)

(72) Inventors: Jimmy Castillo, San Antonio de los Altos (VE); John Richard Ordonez Varela, Lescar (FR)

(73) Assignee: Totalenergies Onetech, Courbevoie (FR)

( * ) Notice: Subject to any disclaimer, the term of this patent is extended or adjusted under 35 U.S.C. 154(b) by 0 days.

(21) Appl. No.: 17/788,853

(22) PCT Filed: Dec. 31, 2019

(86) PCT No.: PCT/IB2019/001440
§ 371 (c)(1),
(2) Date: Jun. 24, 2022

(87) PCT Pub. No.: WO2021/136954
PCT Pub. Date: Jul. 8, 2021

(65) Prior Publication Data
US 2023/0030437 A1 Feb. 2, 2023

(51) Int. Cl.
*E21B 43/16* (2006.01)
*C09K 8/565* (2006.01)
(Continued)

(52) U.S. Cl.
CPC ............... *C09K 8/565* (2013.01); *C09K 8/58* (2013.01); *E21B 43/16* (2013.01); *E21B 43/34* (2013.01); *C09K 2208/10* (2013.01)

(58) Field of Classification Search
CPC ...... C09K 8/565; C09K 8/58; C09K 2208/10; E21B 43/16; E21B 43/34
See application file for complete search history.

(56) References Cited

U.S. PATENT DOCUMENTS

| | | | |
|---|---|---|---|
| 10,906,812 B1 * | 2/2021 | Salah | C01B 32/05 |
| 2011/0008236 A1 * | 1/2011 | Hinman | C01B 21/0685 |
| | | | 423/342 |

(Continued)

FOREIGN PATENT DOCUMENTS

WO 2019/067478 A1 4/2019

OTHER PUBLICATIONS

K. Bogeshwaran et al., "Production of Silica from Rice Husk", International Journal of ChemTech Research, vol. 6, No. 9, Sep. 30, 2014, pp. 4337-4345.
(Continued)

*Primary Examiner* — Silvana C Runyan
(74) *Attorney, Agent, or Firm* — Pearne & Gordon LLP (57) ABSTRACT

A nanofluid preparation method (100) from biogenic material is provided. The method includes the steps of:
(a) Treating (120) biogenic material with a strong acid to remove metal impurities;
(b) Heating (140) the treated biogenic material at a first temperature between 150° C. and 500° C.;
(c) Heating (150) the treated biogenic material at a second temperature above 600° C. to pyrolyze the treated biogenic material;
(d) Grinding (160) the pyrolyzed biogenic material to obtain nanoparticles of biogenic material; and
(e) Mixing (180) nanoparticles of biogenic material with an organic solvent to form a nanofluid, said organic solvent including a low polarity solvent.

A nanofluid obtainable by the nanofluid preparation method and the use of such a nanofluid for reducing fines migration or enhanced crude oil recovery are also provided. A system for enhanced crude oil recovery from a reservoir well is also provided.

18 Claims, 7 Drawing Sheets

(51) Int. Cl.
*C09K 8/58* (2006.01)
*E21B 43/34* (2006.01)

(56) References Cited

U.S. PATENT DOCUMENTS

| 2012/0003136 | A1* | 1/2012 | Skala | C04B 35/62813 |
| | | | | 423/291 |
| 2014/0065050 | A1* | 3/2014 | Clemens | C01B 21/0685 |
| | | | | 423/344 |
| 2018/0320056 | A1 | 11/2018 | Mazyar et al. | |
| 2019/0010382 | A1 | 1/2019 | Kuznetsov et al. | |
| 2019/0299184 | A1* | 10/2019 | Suresh | C09K 8/58 |

OTHER PUBLICATIONS

International Search Report and Written Opinion in PCT/IB2019/001440 dated Sep. 23, 2020, 16 pages.
Chuah Kai Jie et al., "Foam Stability Performance Enhanced with Rice Husk Ash Nanoparticles", Jurnal Teknologi, (Sciences & Engineering), vol. 81, No. 4, Jun. 25, 2019, (10 pages).
McElfresh, Paul, et al. "Application of Nanofluid Technology to Improve Recovery in Oil and Gas Wells." SPE International Oilfield Nanotechnology Conference. Jun. 12-14, 2012. 6 pages.

* cited by examiner

NANOFLUID FOR FINES MIGRATION REDUCTION AND ENHANCED OIL RECOVERY, METHOD OF PREPARATION AND USES

FIELD OF THE INVENTION

The present invention relates to the field of oil and gas recovery. In particular, the invention relates to the field of oil recovery from a reservoir well. This invention provides a new nanofluid preparation method from biogenic material, a nanofluid obtainable by a method according to the invention, a method for reducing fines migration in a reservoir well, a method for enhanced crude oil recovery from a reservoir well and an enhanced crude oil obtainable by a recovery method according to the invention.

DESCRIPTION OF RELATED ART

Oil and gas hydrocarbons are naturally occurring in some subterranean formations. In the oil and gas industry, a subterranean formation containing oil or gas is referred to as a reservoir. A reservoir may be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

The recovery of fluids such as crude oil is troublesome in areas where the subterranean formation is composed of one or more layers or zones which contain migrating fines such as silica, iron minerals, and alkaline earth metal carbonates. Fines migration may result from an unconsolidated or inherently unstable formation, or from use of an incompatible treatment fluid that liberates fine particles. Moreover, crude oils usually contain asphaltenes which are the more polar fraction of molecules in crude oils and which facilitate migration of sand through a coating of the hydrophilic sand particles. Moreover, the interaction of these molecules itself and with surface cause severe problems to the industry. For example, these fines tend to move or migrate to the wellbore and frequently the migrating fines can block the passageways leading to the wellbore, reducing well productivity.

Oil production can also be impacted by the massive sediments and asphaltenes deposition in the pipeline network up to the upgrader. Consequently, wellbores are regularly cleaned using for example gasoil to restore productivity. In particular, in sandstone formations, hydrofluoric acid mixtures are used to dissolve fines. In carbonate formations, the goal is not to dissolve but rather to disperse fines in the wormholes, so hydrochloric acid is used as the treatment fluid. However, these solutions necessitate to be repeated frequently and thereby induce high production costs.

Also, nanoparticles have been at the forefront of research into various applications in the oil and gas industry for at least a decade now. Nanoparticles are usually particles under 100 nm in size and can be made up of various inorganic materials such as silica, alumina and oxides of iron. Nanoparticles (either unmodified or modified) can be dispersed in an aqueous or organic medium such as water, methanol or isopropanol and deployed. Nanoparticles are highly versatile and can be designed for specific applications. The mode of action of nanoparticles in a reservoir highly depends on how they are designed and deployed. In one field trial, a silicon dioxide-based nanoparticle dispersion was deployed in a hydraulic fracturing application (see "Application of Nanofluid Technology to Improve Recovery in Oil and Gas Wells", written by P. M. Mcelfresh, D. L. Holcomb and D. Ector, Society of Petroleum Engineers, doi: 10.2118/154827-MS, 2012, January 1).

Moreover, it has been proposed to use gases and liquid gases containing nanoparticles to enhance hydrocarbon recovery (WO2019067478). Functionalized commercially available colloidal silicas has been used in a process of stimulating hydrocarbon recovery. This process includes introducing a gas, a liquified gas or a vaporized liquified gas, into an underground formation containing hydrocarbons such as crude oil and gas in combination with the insertion of the functionalized nanoparticles into the underground formation containing hydrocarbons.

However, these solutions still necessitate to be repeated frequently and thereby induce high production costs.

Nanoparticles of silicon are particularly useful to create stable and solvent compatible suspensions. They are also useful due to their inherent changes in the electronic structure.

Several methods have been developed to perform the synthesis of these porous materials where in most cases a siliceous precursor is used as a source of silica. These methods are effective for the synthesis of nanostructured materials because they allow a control the size of particle, its morphology and porosity. However, their main drawbacks are their high cost and low sustainability.

Asphaltenes, already mentioned, also impart high viscosity to crude oils, negatively impacting production, also the variable asphaltene concentration in crude oils within individual reservoirs creates a myriad of production problems. Hence, asphaltenes are known to be one of the largest causes of fouling in the heat exchangers of the crude oil distillation preheat train. They are present within micelles in crude oil, which can be broken down by reaction with paraffins under high temperature. Once the protective micelle has been removed polar asphaltenes agglomerate and are transported to the tube walls, where they can stick and form a foulant layer.

Hence, a need exists for solution to reduce asphaltene concentration in crude oils and/or reduce fines migration without implying continuous treatment.

SUMMARY OF THE INVENTION

The following sets forth a simplified summary of selected aspects, embodiments and examples of the present invention for the purpose of providing a basic understanding of the invention. However, the summary does not constitute an extensive overview of all the aspects, embodiments and examples of the invention. The sole purpose of the summary is to present selected aspects, embodiments and examples of the invention in a concise form as an introduction to the more detailed description of the aspects, embodiments and examples of the invention that follow the summary.

The invention aims to overcome the disadvantages of the prior art. In particular, the invention proposes a new nanofluid preparation method from biogenic material, said method allowing the preparation of a new nanofluid that can be used for the reduction of fines migration in a reservoir well and in particular for enhanced crude oil recovery from a subterranean formation. Such a nanofluid based on "green" nanostructured silicon nanoparticles induce absorption of asphaltenes and promote the agglomeration of fines in structures of high permeability retaining the "fines" around a production well.

Also, the present disclosure is designed to allow the production of an enhanced crude oil with low concentration of asphaltenes and reduced viscosity.

Hence, according to an aspect of the present invention, it is provided a nanofluid preparation method from biogenic material, said method comprising the steps of:

Treating biogenic material with an acid, preferably a strong acid, to remove metal impurities;

Heating the treated biogenic material at a first temperature comprised between 150° C. and 500° C.;

Heating the treated biogenic material at a second temperature above 600° C. to pyrolyze the treated biogenic material;

Grinding the pyrolyzed biogenic material to obtain nanoparticles of biogenic material; and Mixing nanoparticles of biogenic material with an organic solvent to form a nanofluid, said organic solvent comprising a low polarity solvent.

Such a method for the preparation of a nanofluid allows, from a biogenic material, the production of a suspension comprising nanoparticles in organic solvent. As it will be described in detail, such a preparation is simple and sustainable compared to standard methods of nanoparticles preparations. Furthermore, it is possible to prepare this nanofluid on a large scale which is indispensable for the oil industry. Moreover, such a nanofluid has a density comparable to treatment fluid density use on field and can reduce the viscosity of crude oil.

According to other optional features of the nanofluid preparation method:

the biogenic materials are selected from the group consisting of: rice husks, bamboo leaf and corn husks.

the acid is selected from any acid having a negative pKa value. With such strong acids many active sites can be released the low polarity solvent is able to solubilize paraffin at a concentration greater than 5 g/100 ml. This allows better performance in asphaltene solubilization and adsorption.

the low polarity solvent is selected from the group consisting of: toluene, hexane, xylene, cyclohexane, cyclooctane and mesitylene; more preferably the low polarity solvent is selected from: toluene or xylene. This allows better performance in asphaltene dissolution.

the organic solvent is a mixture of low polarity solvent and fuel. This allows better performance in asphaltene adsorption.

It comprises a step of functionalizing the nanoparticles of biogenic material.

According to another aspect of the present invention, it is provided a nanofluid obtainable by a nanofluid preparation method according to the invention.

As it will be detailed in the detailed description, such a nanofluid can adsorb at the well level asphaltenes detrimental to the production, promote the agglomeration of fines in structures of high permeability retaining the "fines" around a production well and reduce crude oil viscosity.

Moreover, such an adsorption has been shown irreversible.

Hence, according to another aspect of the present invention, it is provided a method for reducing fines migration in a reservoir well, wherein a nanofluid according to the invention is pumped into the reservoir well.

According to other advantageous features of the method for reducing fines migration in a reservoir well:

the nanofluid according to the invention is pumped into the reservoir well at a pressure greater than 20 atm.

Moreover, according to another aspect of the present invention, it is provided a method for enhanced crude oil recovery from a reservoir well connected to a porous subterranean reservoir containing crude oil, the method comprising the steps of:

Stopping the production of the reservoir well;

Pumping a nanofluid according to the invention into the porous subterranean reservoir; and Resuming the production of the reservoir well to recover enhanced crude oil comprising nanoparticles of biogenic material.

Indeed, the use of a nanofluid according to the invention will allow an adsorption of asphaltene that will no more be found in the crude oil extracted from treated well. This enhanced crude oil, exhibiting reduced level of asphaltene, will also benefit from a reduced viscosity.

According to other advantageous features of the method for enhanced crude oil recovery from a reservoir well connected to a porous subterranean reservoir containing crude oil:

It comprises a step of separating crude oil from nanoparticles of biogenic material. Hence, crude oil can undergo a conventional process but with a lower asphaltene concentration. Moreover, used nanoparticles can be recovered and reused if not saturated.

the separation step of the crude oil from nanoparticles is done at the outlet of the well head, for example with an axial flow cyclone. Such a step is easily implemented.

According to another aspect of the present invention, it is provided an enhanced crude oil obtainable by the method according to the invention. Enhanced crude oil according to the invention is less viscous and has a lower asphaltene concentration. This makes it particularly interesting for the transformation stages.

According to another aspect of the present invention, it is provided a system for enhanced crude oil recovery from a reservoir well connected to a porous subterranean reservoir comprising crude oil, the system comprising:

Controlling means configured to stop and resume the production of the reservoir well; and Pumping means, configured to introduce a nanofluid according to the invention into the porous subterranean reservoir; and Recovering means, configured to recover enhanced crude oil comprising nanoparticles of biogenic material from the reservoir well.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION

A description of example embodiments of the invention follows.

In the following description, "nanofluid" means a fluid, preferably liquid at operating conditions, containing nanometer-sized particles, called nanoparticles. Hence a nanofluid is a heterogeneous fluid. Preferably, nanofluid according to the invention is designed and prepared to resolve a specific condition of a well or subterranean formation.

As used herein, "nanoparticles" are particles between 1 and 150 nanometers (nm) in size, with all three external dimensions inferior to 150 nanometers, and preferably whose longest and shortest axes do not differ significantly, with a significant difference typically being a factor of at least 3.

As used herein, a "biogenic material" is a material made by or of life forms. Biogenic materials are preferably agricultural wastes containing fiber. For example, biogenic material can be selected biogenic husks such as rice husk which is the coating on a seed or grain of rice.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum-producing region, directly or through one or more fractures or flow pathways.

As used herein, "treatment of a subterranean formation" can include any activity directed to extraction of petroleum materials from a subterranean petroleum-producing formation or region, for example, including drilling, stimulation, clean-up, acidizing, completion, cementing, remedial treatment, conformance control, abandonment, and the like. In particular, it can include manipulation of a reservoir's external fluid drive to push out more oil and less water.

The term "downhole" as used herein refers to under the surface of the earth, such as a location within or fluidly connected to a wellbore.

As used herein, a "migrating fines" are particles suspended in the produced fluid prone to bridge the pore throats near the wellbore, reducing well productivity. Fines can include different materials such as clays (phyllosilicates smaller than 4 microns), silts (silicates or aluminosilicates with sizes ranging from 4 to 64 microns), iron minerals, and alkaline earth metal carbonates. Kaolinite and illite are the most common migrating clays.

As used herein, the words "treatment" and "treating" mean an effort used to resolve a condition of a well. Examples of treatments include, for example, completion, stimulation, isolation, or control of reservoir petroleum. As used herein, a "treatment fluid" is a nanofluid comprising nanoparticles of biogenic material.

The term "solvent" as used herein refers to a liquid that can dissolve a solid, liquid, or gas.

Nonlimiting examples of solvents are silicones, organic compounds, water, alcohols, ionic liquids, and supercritical fluids.

As used herein, a "low polarity solvent" refers to a solvent miscible with crude oil. A low polarity solvent can exhibit a relative polarity under 0.2, preferably under 0.1. For example, Toluene and Xylene are hydrophobic and partially hydrophobic organic solvents, derived from benzene, that are miscible with crude oil. A low polarity solvent can also be a paraffinic solvent is preferably a solvent within which paraffin (CAS number: 8002-74-2) can be solubilized at a concentration of at least 5 g/100 g at 38° C.

The term "paraffin" as used herein can refer to a group of high-molecular weight alkane hydrocarbons with the general formula $C_nH_{2n+2}$, where n is greater than 20. It is also called paraffin wax. It can take the form of a solid crystalline mixture of straight-chain (normal) hydrocarbons ranging from C20 to C30 and possibly higher.

As used herein, a "fuel" refers for example to a liquid comprising combustible or energy-generating molecules. Preferably, it refers to a mixture of aliphatic hydrocarbons extracted from petroleum such as diesel, kerosene or gasoline.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

As mentioned, exploitation of wellbore can be impacted by fines migration and by asphaltene deposit in the pipeline network. In a reservoir, fines are homogenously dispersed among sand grain but under the flow of crude oil, the fines are moved by crude oil to the wellbore.

A method has been discovered for an efficient, cost-effective nanofluid preparation by use of biogenic material in combination with an organic solvent comprising a low polarity solvent. Such a method allows the preparation of a nanofluid that can be used to reduce fines migration and produces an enhanced crude oil.

Indeed, it has been discovered that nanoparticles of biogenic material adsorb asphaltene and attach to fines to form a stable formation. Moreover, as exposed in examples, it has been found that this nanofluid prevents asphaltene precipitation and promotes its adsorption to nanoparticles, allowing a reduction of fines migration.

Hence, a nanofluid according to the invention helps fines to be trapped in the sand, and less fines are moved by crude oil to the end of the wellhead. Thus, nanoparticles attach fines and asphaltenes and kept them in the field.

According to a first aspect, the invention relates to a nanofluid preparation method 100 from biogenic material.

Figure 1:
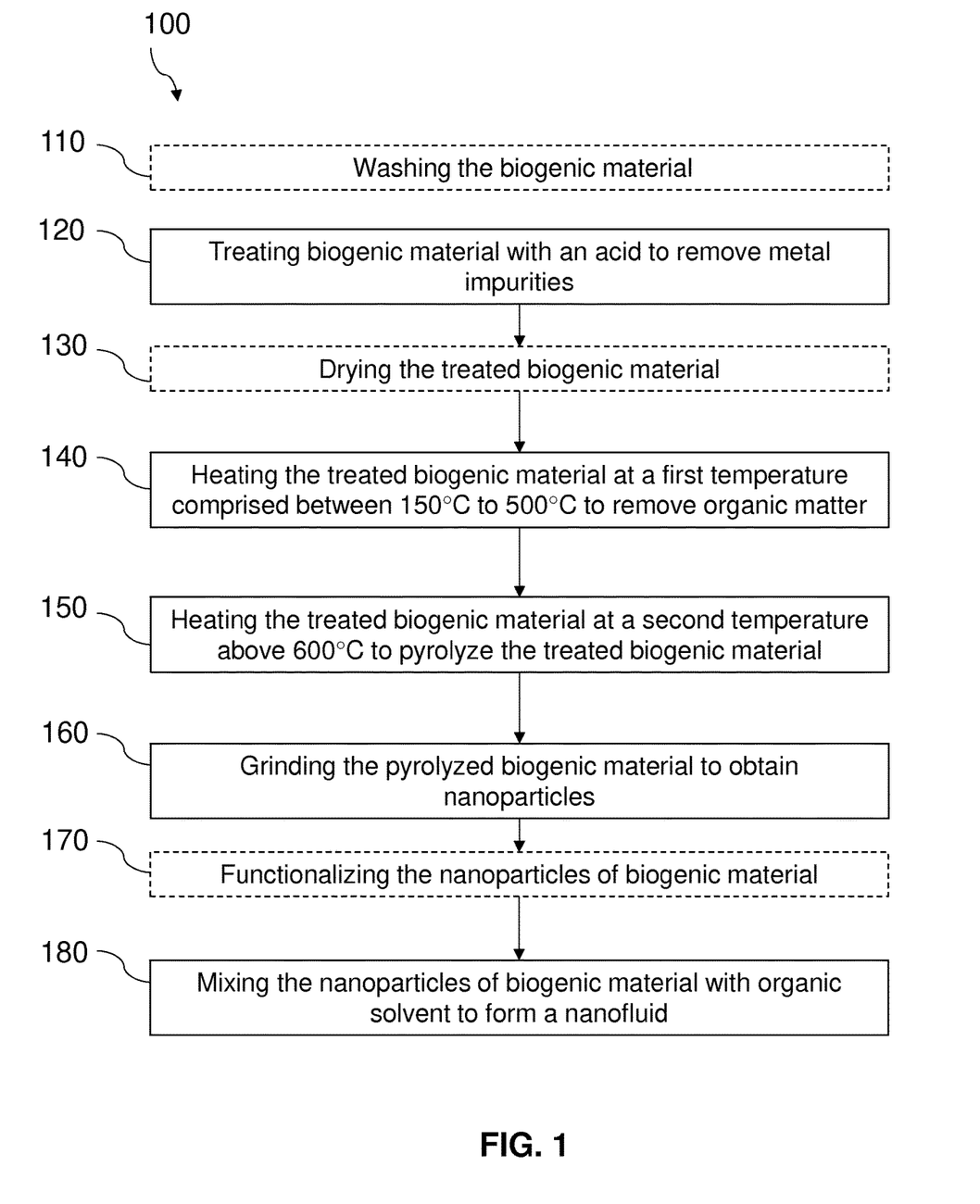
FIG. 1 is a schematic view of a method of a nanofluid preparation.

As shown in FIG. 1, said method comprising the steps of: treating 120 biogenic material with acid, removing the organic matter by heating 140 the treated biogenic material, pyrolyze 150 the treated biogenic material, grinding 160 the pyrolyzed biogenic material to obtain nanoparticles, and mixing 180 nanoparticles of biogenic material with organic solvent to form a nanofluid.

As it will be described after, such a nanofluid is particularly interesting as a treatment fluid used downhole during treatment activities of the well that can increase the production of a well. Such activities include any treatment to remove material obstructing the flow of desired material from the subterranean formation or treatments designed to increase or maintain the production rate of a well.

Preferably, the biogenic materials are selected from: rice husks, bamboo leaves, and corn husks.

More preferably, the biogenic materials are rice husks. Indeed, rice husks contain more than 15% of silicon that grown naturally as amorphous nanoparticles of $SiO_2$ linked by Cellulose, Lignin and other organic molecules.

As shown in FIG. 1, a nanofluid preparation method 100 according to the invention can comprise a step of washing 110 the biogenic material.

As shown in FIG. 1, a nanofluid preparation method 100 according to the invention comprises a step of treating 120 biogenic material with an acid, preferably a strong acid. This step is in particular designed to remove metal impurities and it raises the number of active sites available for its application on field.

This step can be implemented in a mixing tank, such as a tank with a propeller for low speed agitation. In particular, this stage can be performed in a stainless steel tank with low frequency mechanical agitation at room temperature.

In particular, the step of treating 120 biogenic material with acid comprises the suspension of the biogenic material in an aqueous solution comprising at least 5%, preferably at least 10% of an acid, more preferably at least 15% of an acid and even more preferably at least 25% of an acid.

Such a treatment can be conducted for at least one hour, preferably at least 6 hours, more preferably at least 12 hours and it can for example be comprised between 6 hours and 30 hours.

The step of treating 120 biogenic material with an acid can be conducted at ambient temperature. Preferably, the step of treating 120 biogenic material with an acid is conducted at a temperature comprised between 5° C. and 40° C.

An acid can be selected from any acidic compound. Preferably, the acid is selected from: hydrochloric acid, hydrobromic acid, phosphoric acid, sulfuric acid, perchloric acid, hydroiodic acid, nitric acid or mixture thereof.

More preferably, the acid is selected from: hypochloric acid, phosphoric acid and acetic acid or mixture thereof.

As shown in FIG. 1, a nanofluid preparation method 100 according to the invention can comprise a step of drying 130 the treated biogenic material. This step is in particular designed to prepare the treated biogenic material for the next steps.

This step can be implemented in a centrifuge, a press or an oven heating at 60° C.

The step of drying 130 the treated biogenic material can be conducted at a temperature of at least 25° C., preferably at least 50° C. and more preferably at least 60° C. but below 100° C. Even more preferably, the step of drying 130 the treated biogenic material is conducted at about 60° C.

The duration of the step of drying 130 will be highly dependent on the temperature used and the quantity of biogenic material. It can be comprised between 30 minutes and 3 hours.

Preferably, the step of drying 130 can be conducted until the moisture reaches a value of about 15%.

As shown in FIG. 1, a nanofluid preparation method 100 according to the invention can comprise a step of heating 140 the treated biogenic material at a first temperature comprised between 150° C. and 500° C. This step is in particular designed to remove organic matter.

This step can be implemented in a high-temperature furnace with electric or gas heating.

The step of heating 140 the treated biogenic material can be conducted at a temperature of at least 150° C., preferably at least 200° C. and more preferably at least 350° C. but below 500° C. Even more preferably, the step of heating 140 the treated biogenic material is conducted at about 350° C.

The duration of the step of heating 140 will be highly dependent on the temperature used and the quantity of biogenic material. It can be comprised between 1 hour and 5 hours.

As shown in FIG. 1, a nanofluid preparation method 100 according to the invention comprises a step of heating 150 the treated biogenic material at a second temperature above 600° C. This step is in particular designed to pyrolyze the treated biogenic material. After this step, carbon have been vaporized and only remain nanostructured pure silicon.

This step can be implemented in an oven, with a microwave generator, fluidized bed boiler. Preferably, this step is takes place in a conventional high-temperature furnace, which can be heated either with electric energy or using fuel (gas, etc.)

The step of heating 150 the treated biogenic material can be conducted at a temperature of at least 600° C., preferably at least 650° C. and more preferably at least 700° C. Even more preferably, the step of heating 150 the treated biogenic material is conducted at about 700° C.

The duration of the step of heating 150 will be highly dependent on the temperature used and the quantity of biogenic material. It can be comprised between 1 hour and 5 hours.

The step of heating 150 can be followed by a step of removing the ash produced.

As shown in FIG. 1, a nanofluid preparation method 100 according to the invention comprises a step of grinding 160 the pyrolyzed biogenic material to obtain nanoparticles of biogenic material.

This step is in particular designed to produce biogenic material nanoparticles. It is preferably performed after the pyrolyze step 150.

This step can be implemented with a ball mill like a planetary ball mill or a high-speed beads mill, a rod mill, using ceramic cylinders to hit and break the mass of silica ash.

The duration of the step of grinding 160 will be highly dependent on the grinder used and the setting of said grinder. Typically, it can be comprised between 5 minutes and 4 hours under conditions of at the least 150 rpm (for "round per minute").

The step of grinding 160 the pyrolyzed biogenic material allows the production of biogenic material nanoparticles, in particular nanoparticles of pyrolyzed biogenic material. Such nanoparticles preferably have a size distribution comprised between 20 nm and 100 nm (for nanometer).

Such nanoparticles preferably exhibit a porosity of at least 70%, more preferably at least 75%, even more preferably at least 80%. Porosity is for example determined according to the method of gas saturation, water saturation or mercury saturation. Preferably, porosity is determined according to an adaptation of a method of water saturation described in "Suggested methods for determining water content, porosity, density, absorption and related properties and swelling and slake-durability index properties", International Journal of Rock Mechanics and Mining Science, 16, 2; Pergamon Press, Incorporated.

Moreover, nanoparticles of a nanofluid preparation according to the invention can present a pore volume of at least 0.8 mL/g (for milliliter per gram), more preferably at least 0.9 mL/g, even more preferably at least 0.95 mL/g. Pore volume is for example calculated with data from porosity and density.

As shown in FIG. 1, a nanofluid preparation method 100 according to the invention can comprise a step of functionalizing 170 the nanoparticles of biogenic material.

This step is in particular designed to coat or graft the nanoparticles of biogenic material in order to modify their surface properties. For example, modified nanoparticles can attach to polar or non polar compounds and they can form a net trapping fines at the near wellbore. The functionalized nanoparticles may be made from any suitable material. Non-limiting examples of suitable surface functionalized nanoparticle materials include metals, metal oxides, polymers, and resins (e.g., silicone resin).

In preferred embodiments, functionalizing nanoparticles of biogenic material comprise doping the nanoparticles with metals or metal-oxides and surface modification of nanoparticles with polymers.

More preferably, functionalized nanoparticles of biogenic material are grafted with Carboxymethyl Cellulose or Polyethylene Glycol. Indeed, those polymers are biocompatible and biodegradable.

As shown in FIG. 1, a nanofluid preparation method 100 according to the invention comprises a step of mixing 180 nanoparticles of biogenic material with organic solvent to form a nanofluid. This step is in particular designed to put the nanoparticles in optimal conditions for their use in a reservoir well.

The organic solvent is selected from: diesel, kerosene, hexane, xylene, toluene or a mixture thereof.

Inventors have shown that in absence of a low polarity solvent, asphaltene will at least partially precipitate in contact with the nanofluid instead of being adsorbed to the nanoparticles. Hence, although the nanofluid in the absence of a low polarity solvent is useful on fines migrations and enhanced crude oil recovery, the nanofluid preferably contains a low polarity solvent. Preferably, the organic solvent comprises a low polarity solvent.

A low polarity solvent according to the invention ca be selected from the list consisting in: acetone, kerosene, hexane, xylene, toluene, dimethylbenzene (such as 1,2-dimethylbenzene, 1,3-Dimethylbenzene, 1,4-dimethylbenzene), mesitylene, benzene, and ethylbenzene.

The organic solvent can comprise at least 10% by mass of a low polarity solvent, preferably at least 20%, more preferably at least 30%.

More preferably, the organic solvent is a mixture of at least two solvent. For example, the organic solvent is a mixture of diesel and xylene.

In another aspect, the invention relates to a nanofluid obtainable by a method of preparation according to the invention.

As described, the nanofluid is a suspension of nanoparticles of biogenic material in an organic solvent, preferably the organic solvent comprises a low polarity solvent. As it will be described in examples, such a nanofluid adsorbs asphaltene and produces unconsolidated solid phase without decreasing permeability of the rock. Moreover, the nanoparticles disperse homogeneously in the fluid and thus, the use of surfactants is not necessary.

Preferably, a nanofluid according to the invention comprises at least 0.01% by mass of nanoparticles of biogenic material, more preferably at least 0.05% and even more preferably at least 0.1%.

For example, a nanofluid according to the invention comprises from 0.01% to 1% (limits excluded) by mass of nanoparticles of biogenic material, preferably a nanofluid according to the invention comprises from 0.1% to 0.6% (limits included) by mass of nanoparticles of biogenic material, and more preferably a nanofluid according to the invention comprises from 0.1% to 0.5% (limits included) by mass of nanoparticles of biogenic material.

A nanofluid according to the invention can be substantially constituted of an organic solvent and nanoparticles of biogenic material according to the invention.

The invention also relates to the use of a nanofluid according to the invention to reduce fines migration in at least part of a subterranean formation The invention also relates to the use of a nanofluid according to the invention to reduce asphaltenes concentration in oil, preferably in crude oil.

One embodiment of the present invention is a method of treating a subterranean formation, comprising contacting the formation with the nanofluid described herein. In some embodiments, the nanofluid is used in well completion or well maintenance operations.

For example, a method according to the invention can include placing the nanofluid in a subterranean formation. The placing of the nanofluid in the subterranean formation can include contacting the nanofluid and any suitable part of the subterranean formation.

In some examples, the placing of the nanofluid in the subterranean formation includes contacting the nanofluid with or placing the nanofluid in at least a part of a flow pathway or an area surrounding a flow pathway.

In particular, the invention relates to a method for reducing fines migration in a reservoir well connected to a porous subterranean formation. Indeed, as illustrated in example, the adsorption of asphaltene produce an unconsolidated solid phase without decreasing permeability of the rock.

Reducing fines migration methods are often used in open-hole wellbore portions or soft formations where undesirable migration of fines, such as sediment and sand, can enter a production string during production of oil.

Preferably, a nanofluid according to the invention is pumped into the reservoir well. Hence, the nanofluid will be penetrating the porous subterranean formation and it will be placed on the flow path of the crude oil. The pressure needed will be different depending on the reservoir information. Preferably, the nanofluid is pumped into the reservoir well at a pressure above 20 atm, preferably above 50 atm.

In particular, a method for reducing fines migration can comprise:
- providing a subsurface reservoir containing hydrocarbons within,
- providing a wellbore in fluid communication with the subsurface reservoir, and
- pumping the nanofluid according to the invention through the wellbore into the subsurface reservoir.

The wellbore in the second step can be an injection wellbore associated with an injection well or a production well.

In particular, in another aspect, the invention relates to a method 200 for enhanced crude oil recovery from a reservoir well. As previously described, the reservoir well is preferably connected to a porous subterranean formation comprising crude oil.

Figure 2:
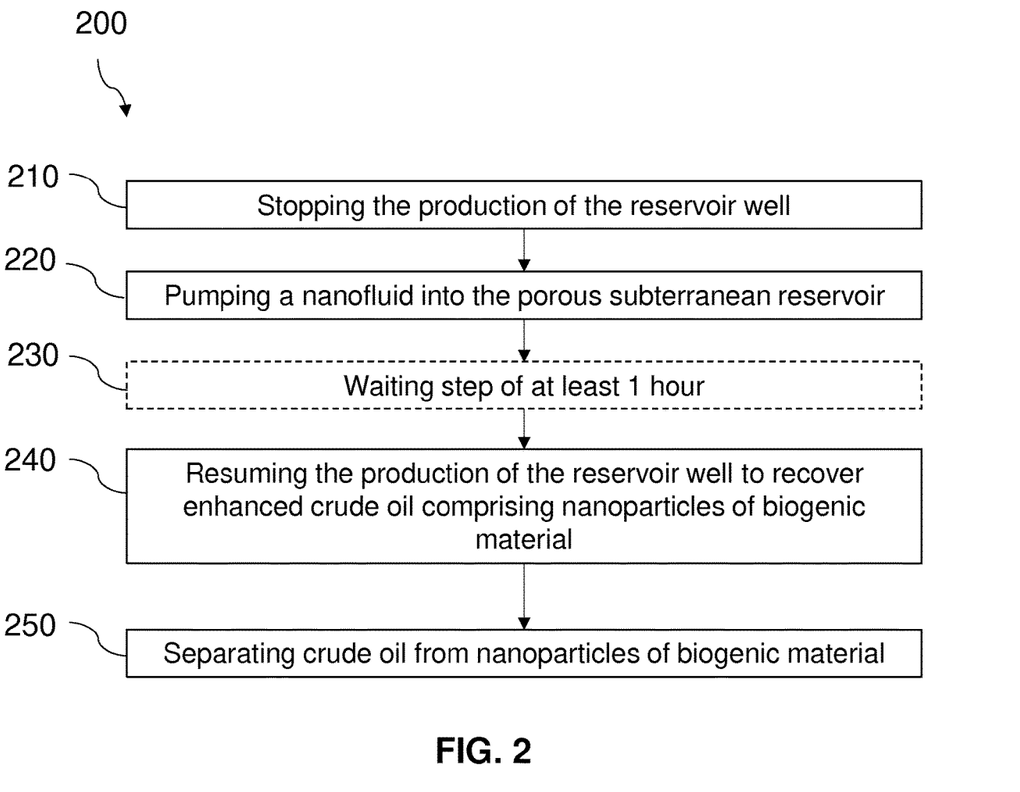
FIG. 2 is a schematic view of a method of enhanced crude oil recovery.

As shown in FIG. 2, the method comprises the steps of: stopping 210 the production of the reservoir well, pumping 220 a nanofluid according to the invention into the porous subterranean reservoir; and resuming 240 the production of the reservoir well to recover enhanced crude oil. Such enhanced crude oil will contains nanoparticles of biogenic material on which asphaltene are adsorbed.

In an embodiment of the invention, the method for enhanced crude oil recovery from a reservoir well can comprise a step of waiting 230 of at least one hour, preferably two hours, more preferably at least 24 hours after the introduction of the nanofluid. More preferably, the waiting step 230 allows nanoparticles of biogenic material of said nanofluid to be in contact to asphaltene and absorbed on fines.

Preferably as illustrated on FIG. 2, a method according to the invention preferably comprises a step of separating 250 crude oil from nanoparticles comprised in the nanofluid.

Such a separation can be conducted using an axial flow cyclone or by decantation in reservoirs.

Preferably, the separation of the crude oil from nanoparticles is done at the outlet of the well head, for example by an axial flow cyclone.

In yet another aspect, the invention relates to an enhanced crude oil obtainable by a method according to the invention.

Preferably, the enhanced crude oil comprises a nanofluid preparation according to the invention. More preferably, enhanced crude oil comprises traces of nanoparticles of biogenic material.

Also, as illustrated, enhanced crude oil will contain less asphaltene.

In the previous embodiments, the present invention can use a system of enhanced crude oil recovery. Hence, in another aspect, the invention relates to a system of enhanced crude oil recovery.

The system of enhanced crude oil recovery can be any suitable system that can use the nanofluid described herein in a subterranean formation, or that can perform a method of reducing fines migration or enhanced crude oil recovery using the nanofluid described herein.

In some embodiments, the system can include a tubular, and a pump configured to pump the nanofluid into the subterranean formation through the tubular.

Figure 3:
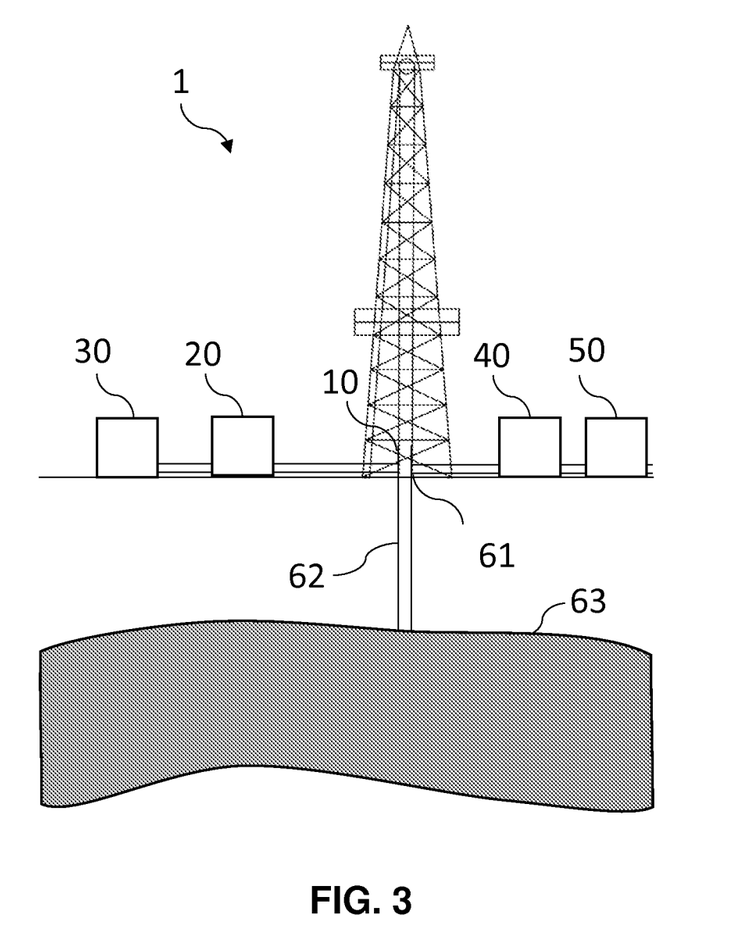
FIG. 3 is a schematic view showing a system for enhanced crude oil recovery.

Such a system is illustrated on FIG. 3. In particular, FIG. 3 shows an illustrative schematic of a system that can deliver a nanofluid of the present invention to a subterranean location. A system according to the invention can comprise classically controlling 10 means configured to stop and resume the production of the reservoir well and recovering 40 means, configured to recover enhanced crude oil comprising nanoparticles of biogenic material from the reservoir well.

As depicted in FIG. 3, a system 1 can include a mixing tank 30, in which an embodiment of the nanofluid can be formulated. In some embodiments, systems or apparatuses described herein can further include a mixing tank that is upstream of the pump and in which the nanofluid is formulated. For example, a tank can comprise the nanoparticles of biogenic material in liquid phase or paste form (any kind of powder form is not recommended in facilities for HSE reasons) while other tanks will comprise the organic solvent.

In other embodiments, however, the nanofluid can be formulated offsite and transported to a worksite, in which case the nanofluid can be introduced to the tubular via the pump directly from its shipping container (e.g., a truck, a railcar, a barge, or the like) or from a transport pipeline. In either case, the nanofluid can be drawn into the pump, elevated to an appropriate pressure, and then introduced into the tubular for delivery to the subterranean formation.

The nanofluid can be conveyed via a line to wellhead 61, where the nanofluid enters tubular 62, with tubular 62 extending from wellhead 61 into subterranean formation 63. Upon being ejected from tubular 62, the nanofluid can subsequently penetrate into subterranean formation 63.

Pumping 20 means, such as a pump, can be configured to raise the pressure of the nanofluid to a desired degree before its introduction into tubular 62. In various embodiments, the pump (e.g., a low-pressure pump, a high-pressure pump, or a combination thereof) can convey the nanofluid from the mixing tank or other source of the nanofluid to the tubular.

The pump can be a high-pressure pump in some embodiments. As used herein, the term "high pressure pump" will refer to a pump that is capable of delivering a nanofluid to a subterranean formation at a pressure of about 1000 psi (for pound-force per square inch) or greater. A high-pressure pump can be used when it is desired to introduce the nanofluid to a subterranean formation and in particular fluidly conveying nanoparticles into the subterranean formation. Suitable high-pressure pumps will be known to one having ordinary skill in the art and can include floating piston pumps and positive displacement pumps.

In other embodiments, the pump can be a low-pressure pump. As used herein, the term "low pressure pump" will refer to a pump that operates at a pressure of about 1000 psi or less. In some embodiments, a low-pressure pump can be fluidly coupled to a high-pressure pump that is fluidly coupled to the tubular. That is, in such embodiments, the low-pressure pump can be configured to convey the nanofluid to the high-pressure pump. In such embodiments, the low-pressure pump can "step up" the pressure of the nanofluid before it reaches the high-pressure pump.

It is to be recognized that system 1 is merely exemplary in nature and various additional components can be present that have not necessarily been depicted in FIG. 3 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

When the production of crude oil is resumed, at least part of the nanofluid can, in some embodiments, exit subterranean formation 63 and flow back to wellhead 61. In some embodiments, the composition that has flowed back to wellhead 61 can subsequently be recovered, and in some examples reformulated, and recirculated to subterranean formation 63.

Hence, preferably a system according to the invention can also comprise separating 50 means, configured to separate nanoparticles from crude oil for example by decantation, filtration or using cyclone effect. Hence, such separating 50 means can for example be selected from: axial flow cyclone, decantation means or filtration means.

EXAMPLE

Preparation, Synthesis of $SiO_2$ Nanoparticles from Waste Plant Material

One of the first steps of the invention is to obtain nanoparticles from waste plant material such as biogenic material. Those nanoparticles are in particular Silicon Oxide $SiO_2$ nanoparticles.

For example, the rice husks contain more than 15% of silicon that grown naturally as amorphous nanoparticles of $SiO_2$ linked by Cellulose, Lignin and other organic molecules.

Rice Husks Treatment: Lixiviation, Burning, and Grinding.

Figure 4:
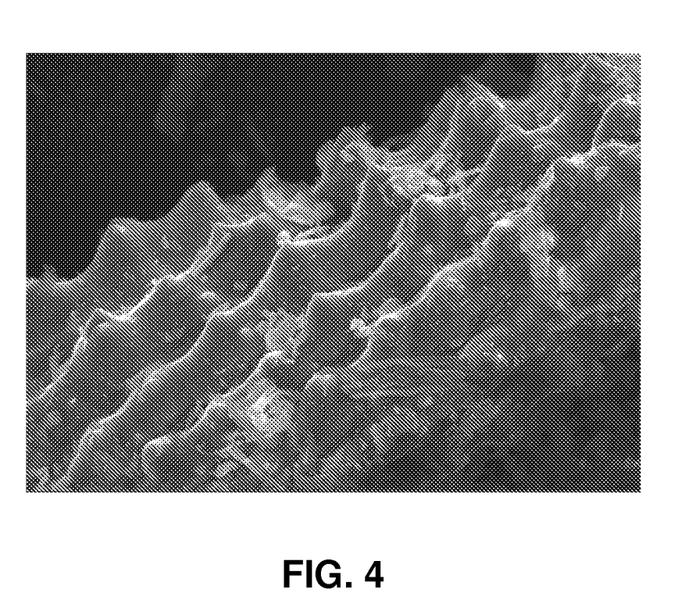
FIG. 4 is a TEM (Transmission Electron Microscopy) image showing fresh calcinated rice husks.

The rice husks have been washed with water to remove dust and dirt from the field, after this rice husks are left in Hydrochloric acid 15% for 24 hours to extract the soluble metals present in the rice husk. This step assures to obtain a maximum in the active sites available. The rice husks are burned in two steps:
  first step: heated to 350° C. during 4 hours/kg of rice husks to burn the organic matter. After this step only Carbon and silicon are presented in the sample,
  second step: the temperature is rise to 700° C. to vaporize the carbon and obtain pure silicon. Pyrolyzed rice husks are shown in FIG. 4.

Figure 5:
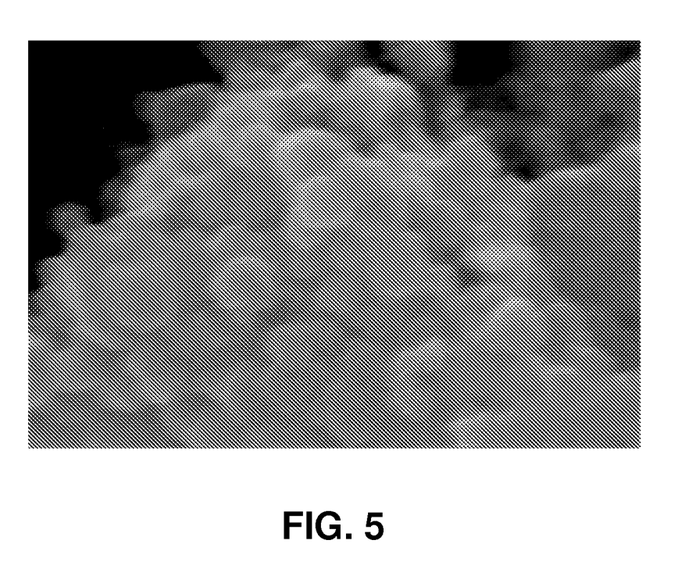
FIG. 5 is a TEM (Transmission Electron Microscopy) image showing nanoparticles of rice husk obtained after using a ball mill on fresh calcinated rice husks.

The aggregate of nanoparticles is separate in single nanoparticles using a ball mill obtaining the nanoparticles presented in FIG. 5.

Nanoparticles Analysis.

The nanoparticles have been characterized by different techniques focusing to obtain the size and form. By Dynamic Light Scattering (DLS) is possible to obtain the hydrodynamic size of the particles. Scanning Electron Microscopy (SEM) and Atomic Force Microscopy (AFM) permit to obtain the real size and structure of the nanoparticles.

Figure 6:
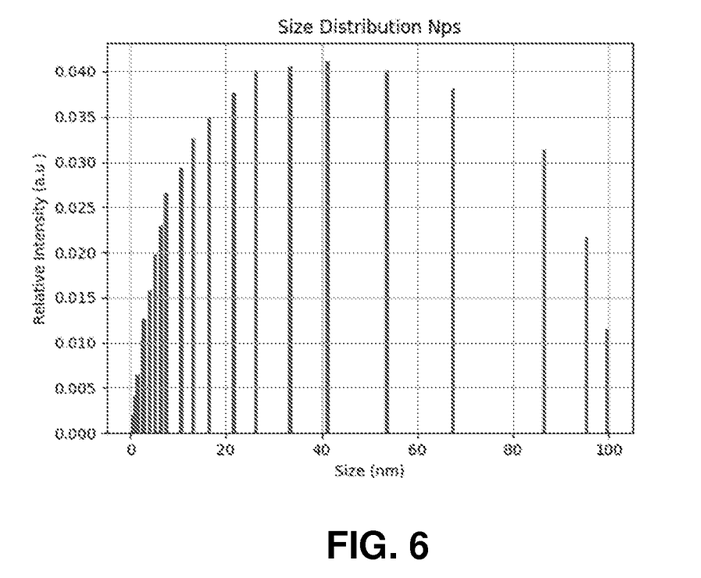
FIG. 6 is a graphical illustration of size distribution of the nanoparticles as measured by a calibrated DLS (Dynamic Light Scattering) instrument.

Nanoparticles dispersed in distillate water at very low concentration are measured with a calibrated DLS instrument. The FIG. 6 shows the size distribution of the nanoparticles, obtaining a wide distribution between 20 nm and 100 nm with a maximum in 40 nm approximately. SEM images corroborated the DLS measurement showing particles from 20 nm to 150 nm in size with a spherical form. Moreover, the AFM image shows aggregate of nanoparticles and single nanoparticles with an average size of approximately 30 nm in height, this is a real size for single nanoparticle.

The density of the nanoparticles has been measured with a pycnometer using a well-known methodology to measure density of dust or porous media. The pycnometer is filled with nanoparticles to ⅔ of the total volume and them complete with water, with the weight and water density the particles density has been calculated.

For our sample the value obtained is near to the value for silicon in crystal form (2.43 g/mL).
  Density of nanoparticles from biogenic material=2.3698 g/mL
  Porosity of nanoparticles from biogenic material=76.67% with a pore volume of: Pore Volume=0.986 mL/g These obtained values allow to understand that nanoparticles of biogenic material have a hollow structure, fulfill of pores.

Functionalization of Nanoparticles of Biogenic Material

In order to variate the surface of the nanoparticles to change the surface activity towards the fluid the nanoparticles were superficially covered with two different molecules:
  Carboxymethyl Cellulose (CMC) and Polyethylene Glycol (PEG)
  both molecules present a polar group which could interact strongly with the nanoparticles and a nonpolar part at the outsize.

Surface Modification with CMC:

To cover the nanoparticles with a layer of CMC, 1 gr of nanoparticles were dispersed in 100 mL of 2000 ppm solution of CMC in water. The mixture is dry until evaporate all the solvent with agitation at very low rate (0.1 mL/min). The dry powder is washed with ethanol to remove the excess of CMC.

Surface Modification PEG:

To cover the nanoparticles with a layer of PEG, 1 gr of nanoparticles were dispersed in 100 mL of 2000 ppm solution of PEG in water. The mixture is dry until evaporate all the solvent with agitation at very low rate (0.1 mL/min) The dry powder is washed with ethanol to remove the excess of PEG.

Nanofluid Preparation

Nanofluid is prepared mixing a defined quantity of nanoparticles (not functionalized) in a mixture 60/40 Diesel/Xylene. This proportion is an optimal to warrant the interaction of nanofluid with crude oils and fines. All nanoparticles concentration, from 0.1 to 1%, form a stable dispersion with low tendency to form aggregates. The dispersions are homogeneous for periods between at least 1 hour to 24 hours depending of the concentration, but even the high concentration dispersion is easily re-dispersed by shaking.

Physical-Chemical Characterization of the Nanofluid

The physicochemical properties of the nanofluids are of great importance due to their effect when they are mixed with the crude oil. Properties like viscosity and density are determinant in the feasibility of mixture and the interfacial tension and contact angle are useful to predict the interaction of the nanofluid with the fines, water or any surface present in the media.

Viscosity, Density, Interfacial Tension, Contact Angle

Inventors surprisingly found that nanoparticles of biogenic material induce a low variation of the Density of the Diesel/Xylene. The density=0.86 g/mL remains almost constant for all the nanoparticles concentrations.

Figure 7:
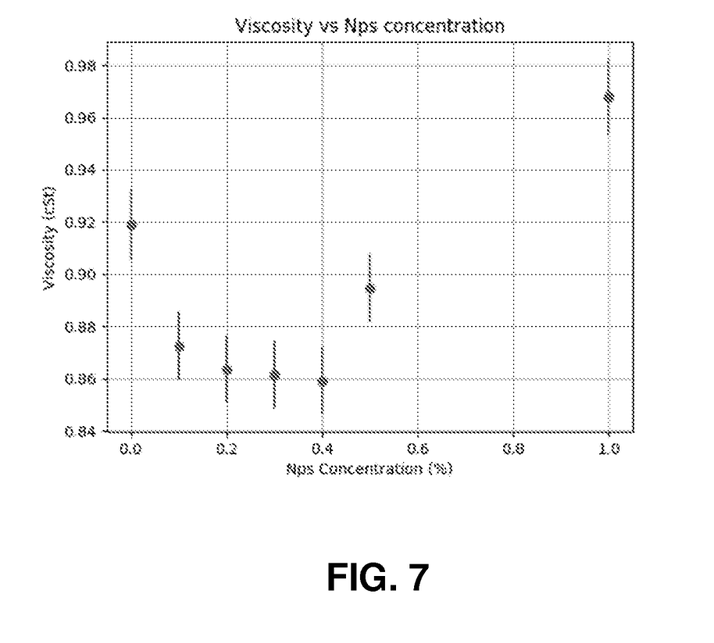
FIG. 7 is a graphical illustration of nanofluids viscosity as a function of nanoparticles concentration.

The viscosity has been measured with Ostwald viscosimeter and following the ASTD445 norm. In the case of nanofluids the behavior depends strongly of the nanoparticles size, concentration and composition. In our case the viscosity diminished in the presence of nanoparticles and has a minimum value in the range of concentrations used. FIG. 7 shown the changes in the viscosity as a function of nanoparticles concentration.

The Interfacial Tension has been measured by the drop shape technique. A drop of the nanofluid is formed and using the contour of the drop and Young-Laplace equations the interfacial tension has been calculated.

Figure 8:
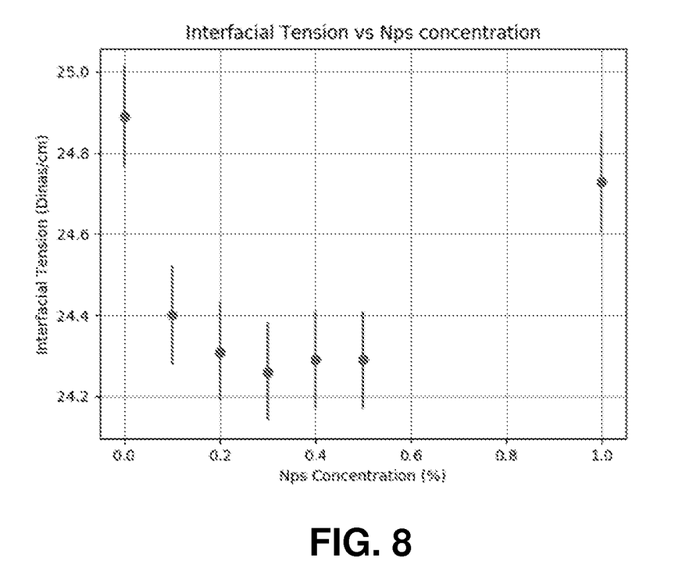
FIG. 8 is a graphical illustration of interfacial tension of the nanofluid as a function of nanoparticles concentration.

FIG. 8 shows the variation of the interfacial tension of the nanofluid as a function of the nanoparticle concentration, the plot shown a minimum around 0.4% of nanoparticles. This value could be associated with the necessary nanoparticles concentration to saturate the interface.

The interaction of the nanofluid with a surface is followed by the determination of the contact angle. To measure the contact angle, a drop of the nanofluid is put onto a surface and the angle formed between the drop and the surface is measure with a digital goniometer. The selected surface was pure Si. Hence this surface presents a relative low wettability to the nanofluid base, surfaces like mica, glass or tetrafluoroethylene has a high wettability to the nanofluid making it impossible to measure the contact angle.

The contact angle of the nanofluid as a function of nanoparticles concentration increase and reach a maximum at 0.4% of nanoparticles of biogenic material, this value being the saturation value at interface.

Uses of the Nanofluid According to the Invention

Interaction Asphaltene—Nanofluid

One of the important issues in the interaction of crude oils and solids in reservoir is the presence of the crude oil sub-fraction called asphaltenes. The asphaltenes are the more polar fraction of molecules in crude oils and the interaction of these molecules itself and with surface cause severe problems to the industry.

Solubility tests have been done to ensure the compatibility of the nanofluids with asphaltenes. Asphaltenes 1000 ppm (for "part per million") were both soluble in Toluene and in a mixture Diesel/Xylene (60/40) (B). In absence of a low polarity solvent such as toluene or xylene, asphaltenes shown a low precipitation. From the optimization a nanofluid was obtained in the mixture Diesel/Xylene (60/40) lower Xylene rations induce asphaltene precipitation causing severe inconvenience for the process.

Figure 9:
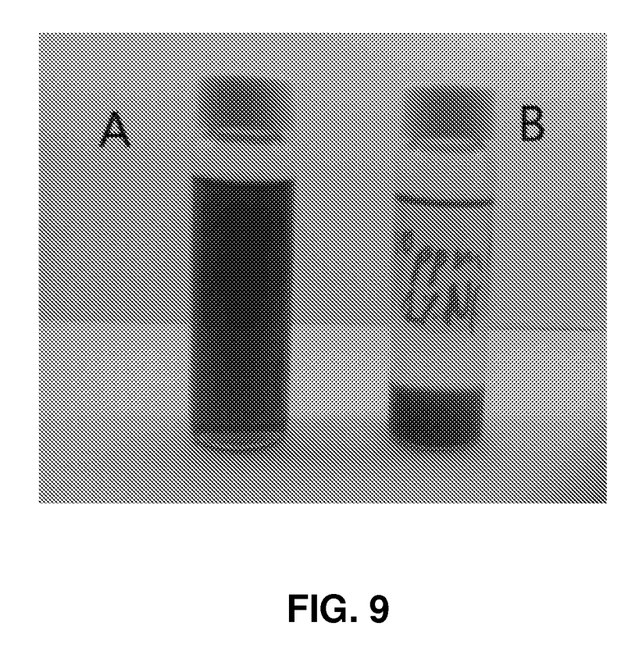
FIG. 9 is a photography representing asphaltene in Diesel/Xylene (9A) and asphaltene in a nanofluid according to the invention (9B).

FIG. 9 presents a test of solubility of asphaltenes 100 ppm in Toluene (FIG. 9A) and asphaltene 100 ppm in a nanofluid Diesel/Xylene (60/40) comprising 1% of nanoparticles of biogenic material (FIG. 9B.) The FIG. 9B shows that the nanoparticles adsorb the asphaltenes present in the sample forming structures with mayor size which decant forming a solid phase. This solid phase was not well consolidated nor compact.

Interaction Fines—Nanofluid

The interaction of the nanoparticles with "fines" are of interest to understand the effect of the nanofluid on the mixture crude oils with "fines".

Figure 10:
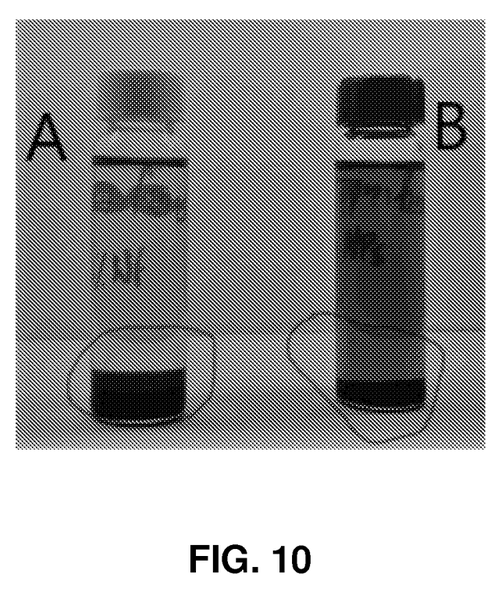
FIG. 10 is a photography representing fines in nanofluid according to the invention (10A) and fines in Diesel/Xylene (10B).

In this experiment 10 mL of the Diesel/Xylene mixture is put in contact with 1 g of "fines". As shown in FIG. 10B, the mixture works as dissolvent desorbing part of the molecules adsorbed by the "fines". In FIG. 10A, 10 mL of a 1% nanofluid is put in contact with 1 g of "fines" in this case the solution is clearly, showing that less molecules are desorbed from the "fines" and more important the solid phase change to form a unconsolidated solid phase.

Hence, a fast and efficient method of producing a nanofluid from biogenic material has been described. Moreover, such a nanofluid prove to have a positive influence on the migration of fines. The nanoparticles of the nanofluid adsorb asphaltenes, adhere easily to fines and sand, and produce unconsolidated solid phase. Those properties are involved in the formation of a macro porous structure between nanoparticles/fines/asphaltenes.

Furthermore, viscosity of crude oil has been reduced after nanofluid interaction compared with original crude oil and hence allow the production of an enhanced crude oil exhibiting lower viscosity, lower concentration of asphaltene.

The invention claimed is:

1. A nanofluid preparation method from a biogenic material, said method comprising steps of:
   (a) Treating the biogenic material with an acid to remove metal impurities thereby forming a treated biogenic material;
   (b) Heating the treated biogenic material at a first temperature between 150° C. and 500° C. to remove organic matter, thereby forming a first heat treated biogenic material;
   (c) Heating the first heat treated biogenic material at a second temperature above 600° C. to pyrolyze the first heat treated biogenic material, thereby forming a pyrolyzed biogenic material;
   (d) Grinding the pyrolyzed biogenic material to obtain nanoparticles of the pyrolyzed biogenic material; and
   (e) Mixing said nanoparticles of pyrolyzed biogenic material with an organic solvent to form a nanofluid, said organic solvent comprising a low polarity solvent, wherein the low polarity solvent is miscible with crude oil or is able to solubilize paraffin at a concentration greater than 5 g of the paraffin/100 mL of the low polarity solvent at 38° C.

2. The nanofluid preparation method according to claim 1, wherein the biogenic material is selected from the group consisting of: rice husks, bamboo leaves and corn husks.

3. The nanofluid preparation method according to claim 1, wherein the acid has a negative pKa value.

4. The nanofluid preparation method according to claim 1, wherein the low polarity solvent is selected from the group consisting of: toluene, hexane, xylene, cyclohexane, cyclooctane, and mesitylene.

5. The nanofluid preparation method according to claim 1, wherein the organic solvent is a mixture of the low polarity solvent and at least one fuel selected from the group consisting of diesel, kerosene or gasoline.

6. The nanofluid preparation method according to claim 1, further comprising a step of functionalizing the nanoparticles of pyrolyzed biogenic material.

7. The method of claim 1, wherein the treated biogenic material is heated in step b) for between 1 hour and 5 hours to remove the organic matter.

8. The method of claim 1, wherein the treated biogenic material is heated in step b) for about 4 hours per kilogram of treated biogenic material to remove the organic matter.

9. The method of claim 1, wherein the first heat treated biogenic material is heated in step c) for between 1 hour and 5 hours to pyrolyze the first heat treated biogenic material.

10. A nanofluid obtained by the nanofluid preparation method according to claim 1.

11. A system for enhanced crude oil recovery from a reservoir well connected to a porous subterranean reservoir comprising crude oil, the system comprising:
   means for stopping and resuming production of the reservoir well;
   means for pumping the nanofluid according to claim 8 into the porous subterranean reservoir; and
   means for recovering enhanced crude oil comprising nanoparticles of pyrolyzed biogenic material from the reservoir well.

12. A method for reducing fines migration in a reservoir well, wherein the nanofluid according to claim 10 is pumped into the reservoir well.

13. The method for reducing fines migration according to claim 12, wherein the nanofluid is pumped into the reservoir well at a pressure greater than 20 atm.

14. A method for enhanced crude oil recovery from a reservoir well connected to a porous subterranean reservoir containing crude oil, the method comprising steps of:
  (a) Stopping production of the reservoir well;
  (b) Pumping the nanofluid according to claim 8 into the porous subterranean reservoir; and
  (c) Resuming the production of the reservoir well to recover enhanced crude oil comprising said nanoparticles of pyrolyzed biogenic material.

15. Enhanced crude oil obtained by the method according to claim 14.

16. The method for enhanced crude oil recovery according to claim 14, further comprising separating recovered crude oil from said nanoparticles of pyrolyzed biogenic material.

17. The method for enhanced crude oil recovery according to claim 16, wherein the separation step of the recovered crude oil from nanoparticles is done at an outlet of a well head.

18. The method of claim 17, wherein the separation step of the recovered crude oil from the nanoparticles is done with an axial flow cyclone.

\* \* \* \* \*